United States Patent [19]

Dholakia

[11] 4,423,500
[45] Dec. 27, 1983

[54] STYLUS LIFTING/LOWERING ACTUATOR WITH AIR DAMPING

[75] Inventor: Anil R. Dholakia, East Windsor, N.J.

[73] Assignee: RCA Corporation, New York, N.Y.

[21] Appl. No.: 300,120

[22] Filed: Sep. 8, 1981

[51] Int. Cl.³ .............................................. G11B 17/06
[52] U.S. Cl. ..................................... 369/230; 369/170
[58] Field of Search ....................... 369/230, 216, 170

[56] References Cited

U.S. PATENT DOCUMENTS 3,952,145  4/1976  Allen .
3,972,533  8/1976  Huff .
4,030,124  6/1977  Allen .
4,053,161  10/1977  Bleazey .
4,059,277  11/1977  DeStephanis .
4,266,785  5/1981  Burrus ................... 369/216

*Primary Examiner*—Steven L. Stephan
*Attorney, Agent, or Firm*—E. M. Whitacre; J. S. Tripoli; W. H. Meise

[57] ABSTRACT

A lifting-lowering assembly for a stylus arm employs two flat portions having a pivot axis in the vicinity of the intersection of the two portions, a stylus arm rest on the first portion, and, an upwardly extending member on the second portion. The upwardly extending member cooperates with an electromagnetic device to rotate the assembly about the pivot axis. Air trapped under the first and second flat portions tends to permit gentle lifting and lowering operations by damping the rotational motion of the assembly.

11 Claims, 4 Drawing Figures

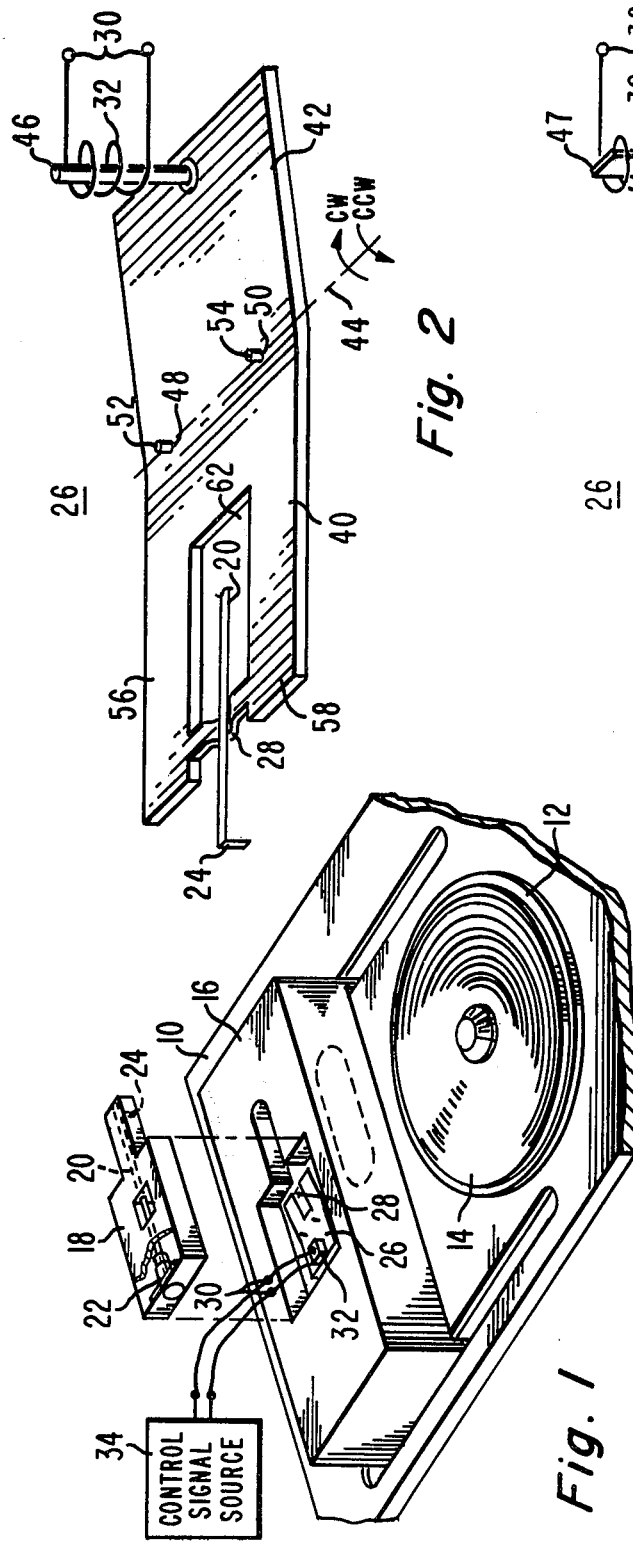
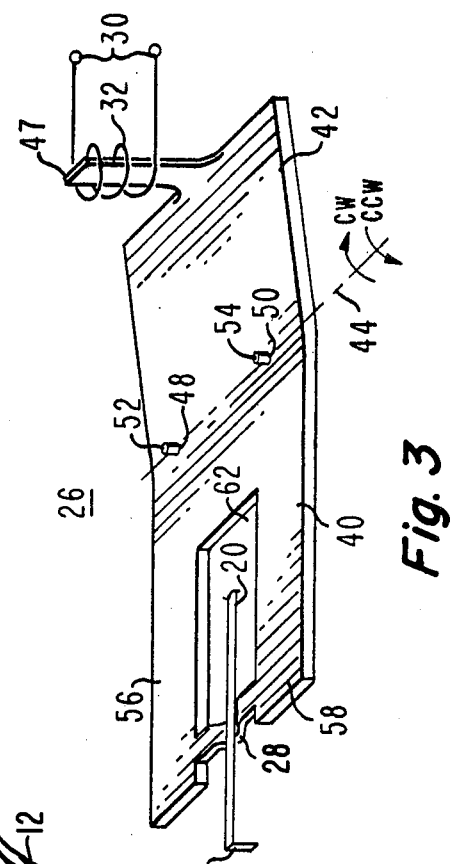
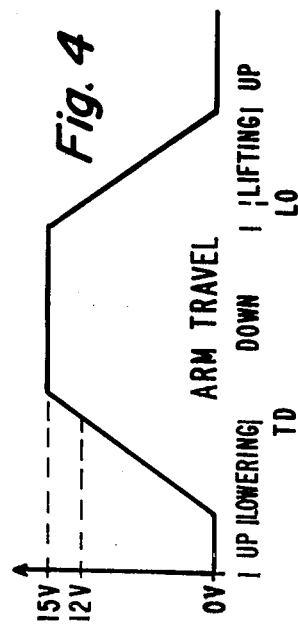
Fig. 1
Fig. 2
Fig. 3
Fig. 4

STYLUS LIFTING/LOWERING ACTUATOR WITH AIR DAMPING

The present invention relates generally to a stylus arm lifting/lowering apparatus, and, more particularly, relates to apparatus suitable for use in a video disc player for lowering and lifting an arm, carrying a stylus at one end thereof, relative to a video disc record.

In certain video disc systems, video information is recorded by means of geometric variations contained in an information track on a disc record. In capacitive type systems the information is recovered by permitting engagement of the information track with a stylus. The stylus, typically, has a conductive electrode which together with conductive properties of the record forms a capacitance which varies in accordance with the recorded information, corresponding to the geometric variations, when relative motion is established between the stylus and the record. The capacitance variations are converted to electrical signals by suitable circuitry.

In such systems, the stylus is generally affixed at one end of a stylus arm. The other end of the stylus arm is coupled to a support member such as a cartridge which is placed in a carriage. The carriage is made to traverse a path laterally over the record in a timed relationship to the rotation of the record. The compliancy of the coupling of the stylus arm to the support member allows the stylus to pass through an opening in the bottom of the carriage to permit stylus/record engagement during playback.

In such systems, the stylus arm is usually made from a very thin elongated member. In addition, the geometric variations which correspond to the recorded information have depths in the track on the order of a fraction of a micron. The stylus/record system is, as a result of these factors, fragile.

A problem which has been encountered in such systems is damage to the information track when the stylus is let down onto the record and lifted up from the record. Video disc systems of this nature require gentle lowering and lifting of the stylus in order to avoid, or at least minimize, such damage. The stylus should not be suddenly dropped down onto a record which is already being rotated. In addition, the stylus should not be suddenly jerked off the record during the lifting operation. Since the stylus is supported on a long thin member, a sudden lift may cause an oscillatory motion of the stylus end of the arm whereupon pecking damage to the record could result.

In order to avoid damage to the record, and possibly the stylus, during the lifting and lowering operations, it is desirable to provide apparatus which will smoothly and reliably perform these lifting and lowering operations.

In U.S. Pat. No. 4,266,785, issued to T. W. Burns on May 12, 1981, a lifting/lowering actuator with an improved electromagnetic motor is described. The Burrus arrangement uses a permanent magnet within the central volume of a coil wound around a core. The magnet is mounted on a leaf spring and a stylus arm rest is connected to the leaf spring. Normally, the resiliency of the spring is sufficient to keep the stylus arm above the record even in the absence of power being applied to the player. When the coil is energized, the permanent magnet is repelled out of the air gap and the stylus arm is lowered gently, eventually permitting stylus/record contact. In practice, the Burrus arrangement is a reliable structure for accomplishing the desired result. The present invention seeks to accomplish similar desirable results at a reduced cost.

In accordance with the present invention apparatus is used which employs, inter alia, the technique of air damping to lift and lower a stylus arm.

The present invention is embodied in a playback system for recovering prerecorded information from a record which is rotatably supported on a turntable. The system includes a support member and a stylus arm having a pickup stylus mounted at one end of the arm. The other end of the arm is secured to the support member. The lifting-lowering apparatus comprises a frame having first and second portions. The first portion lies in a first plane and the second portion lies in a second plane at an angle relative to the first plane. A pivot axis is formed in the vicinity of the intersection of the two portions of allow rotational motion of the frame about the pivot axis. A stylus arm receiving means is connected to the first portion. An electromagnetic means is operatively coupled to the second portion for causing rotation of the frame about the pivot axis.

IN THE DRAWING

FIG. 1 is a sketch of a video disc player showing the lifting-lowering mechanism of the present invention positioned in a carriage assembly;

FIG. 2 is a sketch of the preferred embodiment of the frame of the lifting-lowering apparatus;

FIG. 3 is a sketch of another embodiment of the frame of the lifting-lowering apparatus; and FIG. 4 is a representation of the voltage versus arm travel waveform which may be used with the present invention.

Referring now to FIG. 1, a portion of a video disc player is shown comprising a base 10, a rotatable turntable 12 for supporting a video disc record 14 and a carriage 16. Carriage 16 moves laterally to traverse the record along a radial line of turntable 12.

Carriage 16 is provided with an opening in the upper surface to receive a cartridge 18. Cartridge 18 includes a pickup arm 20 which is compliantly connected, via compliant coupler 22, on one end, and, carries the stylus 24 which comprises a diamond tip having an electrode deposited thereon at the other end of the stylus arm. Coupling 22 has enough compliance to permit the arm 20 to move up and down as well as side to side during playback when the cartridge 18 is inserted in the player carriage 16.

Through the opening on the top surface of the carriage 16, there is shown a stylus lifting-lowering frame 26. This device is adapted to be mounted to the carriage so that in the event of a stylus replacement, the lifting-lowering device need not be replaced.

When the cartridge 18 is positioned in the carriage 16, the stylus arm 20 will come to rest (in the above-record position) on the member 28 of the frame 26. The lifting-lowering assembly also includes a pair of terminals 30 which are electrically connected to a coil 32. Terminals 30 are adapted for connection to an energization means including a control signal source 34. Source 34 provides a particular form of signal to the device 26 and will be discussed in more detail herein.

FIG. 2 shows the details of the preferred embodiment of the frame 20 of the lifting-lowering assembly. The frame 26 comprises two main portions, 40 and 42. These portions lie in two respective planes which are at an obtuse angle with respect to each other. Thus, at the intersection of these two planes a pivot axis 44 is generated. The frame 26 is now capable of rotating in both directions (clockwise and counterclockwise) about the pivot axis 44.

Portion 42 of frame 26 is formed, as shown, from a relatively thin flat sheet of material such as aluminum or soft steel. At the far end of portion 42, relative to the pivot axis 44, there is fixedly attached an upwardly extending member 46 which, in this embodiment, is a permanent magnet. Permanent magnet 46 is arranged such that it occupies a position in the air gap provided in the center of coil 32. Coil 32 is typically wound around a plastic core. The plastic core has a through hole along its elongated central axis.

Along the pivot axis 44 of the frame 26 are located two holes 48 and 50. These through holes are arranged to align with pins 52 and 54 respectively. Pins 52 and 54 are attached to the carriage 16.

The outer portion 40 of frame 26 includes elogated flat legs 56 and 58. A stylus arm rest 28 is positioned in the vicinity of the distal end, relative to the pivot axis 44, of portion 40 between the legs 56 and 58. This arrangement leaves an opening 62 in portion 40.

In the at rest position, i.e. when stylus/record contact is not desired, the weight of portion 42 of frame 26 is such that the frame pivots back about the axis 44 so that the bottom surface of portion 42 is in contact with the carriage bottom surface, and as a result the arm rest 28 is raised up and therefore, the stylus is not in contact with the record.

When it is desired to lower the stylus onto the record, a signal is applied at terminals 30, the magnet 46 is drawn further into the air gap in the center of coil 32, thereby raising portion 42 and lowering portion 40 about the pivot axis 44. As the portion 40 is lowered, air is trapped between the bottom surface of portion 40 and the top surface of the bottom of the carriage 16 so as to soften the descent of the stylus onto the record through the hole in the bottom of the carriage. In addition, a vacuum is created between the bottom surface of portion 42 and the top surface of the bottom of carriage 16. When portion 42 starts to rise, the motion of portion 42 is dampened as a result of the existence of this vacuum. This aids in softening the motion of the frame 26.

When it is desired to raise the stylus the appropriate signals are applied at terminals 30 to repel the magnet 46 in a direction away from the air gap, i.e. down, thus rotating the frame 26 clockwise and raising the arm rest 28 in the process. Again, air is trapped between the bottom surface of portion 42 and the top surface of the bottom of carriage so as to soften the rotational movement of frame 26 and thereby gently lift the stylus from the record. Now the vacuum created under portion 40 helps to dampen the frame motion in the clockwise direction.

The amount of air damping both on lifting and lowering of the stylus is dependent upon the surface areas of section 42 (on lifting) and 40 (on lowering). Thus, one can control the air damping by adjusting the operative surface areas involved.

The specific obtuse angle between the two portions 40 and 42 is dependent upon the particular physical environment. That is, it depends upon how high one wishes to lift the stylus rest as well as the lengths of each of the sections 40 and 42. Typically, the stylus rest 28 is made to over travel when lowering the stylus so that the stylus arm rest 28 does not interfere with the arm 20 during normal playback of a video disc record.

FIG. 3 shows another embodiment for the frame 26 which is similar to that shown previously. The primary difference here is that the upwardly extending member 47 is not a permanent magnet but is formed out of a material such as soft steel or iron to act as a pole piece for the electromagnetic circuit which includes coil 32. In this case, the pole piece 47 is drawn upwardly when the appropriate signal is applied to terminal 30, thereby lowering the stylus onto the record, and, in the absence of a signal to the terminals the weight of portion 42 and the force of gravity act to rotate frame 26 in the clockwise direction to raise the stylus arm 20. Again air damping occurs in both the lifting and lowering of the stylus arm 20.

The embodiment of FIG. 3 is desirable from the economic point of view in that the frame 26 can be made completely from one sheet of material and the elimination of the permanent magnet is a cost savings.

However, in actual practice it has been found that the inclusion of the permanent magnet gives more precise control over the movement of the frame than the single piece construction.

In each case, the air damping has shown itself to be a desirable feature in the sense of facilitating the soft or gentle lifting and lowering of the stylus arm.

FIG. 5 shows an idealized curve of voltage applied to terminals 30 versus stylus arm travel for the embodiment of FIG. 2. Initially, with no voltage applied, the arm 20 is resting on the arm rest 28 well above the record 14. As the voltage increases, the magnetic field builds in the air gap and the magnet 46 is attracted (slowly and gently) further into the air gap. As this happens, the arm 20, still resting on member 28, is slowly lowered toward the surface of the record 14. At the idealized 12 volt position on the curve, the stylus has touched down (TD) on the record 14. It is desirable to make the arm rest 28 go down toward the record even further, so that the stylus arm 20 is disengaged from member 28 so that the arm is free to move in all directions permitted by the system without interference from the lifting-lowering assembly. To do this, the control signal is made to go to the 15 volt level and is held at this level throughout the disc playback sequence. When it is desired to lift the stylus 24 from the record 14, the control signal is reduced in a controlled fashion. As the curve goes through the idealized 12 volt level, the arm rest 28 comes into contact with the arm 20 and the stylus is lifted off (LO) the record. The process continues until the magnet 46 is lowered to its initial position in the air gap in the central volume of the core about which coil 32 is wound.

It is evident that the particular shape of the frame 26 may be varied while still practicing the spirit of the present invention, i.e. utilizing an air damping mechanism to permit gentle lowering and lifting of the stylus arm.

What is claimed is:

1. In a playback system for recovering prerecorded information from a record, said record being rotatably supported on a turntable, said system including a support member and a stylus arm having a pickup stylus mounted at one end of said arm, said arm being secured at the other end to said support member, the apparatus comprising:

a frame having first and second flat portions, said first portion lying in a first plane and said second portion lying in a second plane at an angle to said first plane;

means connected to said first portion and adapted to receive said stylus arm;

coupling means coupled to the intersection of said first and second positions for forming a pivot axis for allowing rotational motion of said frame about said axis, said coupling means being arranged relative to said support member with said rotational axis arranged so that one of said first and second flat portions lies substantially flat against said support member at the extreme of rotation of said frame in a manner tending to create a vacuum between said support member and said first flat portion, and pressure between said support member and said second flat portion for a first direction of rotation of said frame, and tending to create pressure and vacuum between said support member and said first and second flat portions, respectively, for a second direction of rotation; and means for effecting rotational motion of said frame whereby said pressure and vacuum tend to damp the rotation.

2. The apparatus according to claim 1 wherein said means for effecting rotational motion comprises electromagnetic means and includes a member extending upwardly in the vicinity of the distal end of said second portion of said frame and wherein the weight of said second portion relative to said first portion is sufficient to pivot said frame toward said distal end of said second portion while said stylus arm receiving means supports said stylus arm thereby preventing stylus/record contact.

3. The apparatus according to claim 2 wherein said electromagnetic means comprise a coil wound around a core with said core defining a central volume into which said upwardly extending member is normally positioned, said coil further comprising a pair of terminals for receiving energization signals.

4. The apparatus according to claim 3 wherein said upwardly extending member comprises a permanent magnet.

5. The apparatus according to claim 3 wherein said upwardly extending member comprises a pole piece.

6. The apparatus according to claim 3 wherein said system further comprises a stylus arm carriage mounted for lateral motion with respect to said turntable and wherein said support member comprises a cartridge adapted to be received in said stylus arm carriage and wherein said frame is mounted to said carriage.

7. The apparatus according to claim 6 wherein said frame includes a pair of through holes along said pivot axis and said carriage includes pair of pins adapted to pass through said pivot holes for positioning said frame in said carriage.

8. In a playback system for recovering prerecorded signals from a record, said record being rotatably supported on a turntable, said system including a support member and a stylus arm, said stylus arm having a pickup stylus mounted on one end and being pivotally secured to said support member at the other end, the apparatus comprising:

a frame having a first and second flat portion, said first portion lying in a first plane and said second portion lying in a second plane, said first portion including a pair of elongated parallel flat members with an opening between said parallel members along at least a portion of the elongated dimension;

pivot means coupled to the intersection of said first and second portions forming a pivot axis for allowing rotational motion of said frame about said pivot axis, said pivot means being arranged relative to said support member with said pivot axis arranged so that one of said first and second flat portions lies substantially flat against said support member at the extremes of rotation of said frame in a manner tending to create pneumatic pressure between said support member and one of said first and second flat portions and vacuum between said support member and the other of said first and second flat portions during rotation between said extreme for providing damping;

a stylus arm rest connected between said parallel members and adapted to receive said stylus arm;

an upwardly extending member connected at the distal end of said second portion relative to said pivot axis;

the weight of said second portion relative to said first portion being sufficient to normally pivot said frame toward said distal end while said stylus arm rest supports said stylus arm;

an assembly comprising a coil wound around a core defining a central volume forming an air gap, said assembly having a pair of terminals connected to said coil; said assembly being mounted relative to said upwardly extending member such that said upwardly extending member normally occupies a portion of said air gap; and means for applying an energization signal to said pair of terminals such that said upwardly extending member moves in said air gap and said frame pivots about said pivot axis thereby permitting stylus/record contact.

9. The apparatus according to claim 8 wherein said system further comprises a stylus arm carriage mounted for lateral motion with respect to said turntable and wherein said support member comprises a cartridge adapted to be received in said stylus arm carriage, and wherein said frame includes a pair of holes along said pivot axis; and said carriage includes a pair of pins adapted to pass through said holes for positioning said frame in said carriage.

10. The apparatus according to claim 9 wherein said upwardly extending member comprises a permanent magnet.

11. The apparatus according to claim 9 wherein said upwardly extending member comprises a pole piece.

* * * * *